United States Patent
Schreter et al.

(10) Patent No.: US 9,483,512 B2
(45) Date of Patent: Nov. 1, 2016

(54) COLUMNAR DATABASE USING VIRTUAL FILE DATA OBJECTS

(75) Inventors: Ivan Schreter, Malsch (DE); Thorsten Glebe, Leimen (DE); Tobias Scheuer, Bruchsal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/290,866

(22) Filed: Nov. 7, 2011

(65) Prior Publication Data

US 2013/0117247 A1    May 9, 2013

(51) Int. Cl.
*G06F 17/30* (2006.01)

(52) U.S. Cl.
CPC .............................. *G06F 17/30315* (2013.01)

(58) Field of Classification Search
USPC ....... 707/649, 662, 679, 703, 704, 726, 727, 707/755, 758, 769, 781, 802, 812
See application file for complete search history.

(56) References Cited

U.S. PATENT DOCUMENTS

| | | | |
|---|---|---|---|
| 6,901,403 B1* | 5/2005 | Bata et al. | |
| 7,653,651 B1 | 1/2010 | Pavlov | |
| 7,890,469 B1* | 2/2011 | Maionchi et al. | 707/654 |
| 2006/0136464 A1 | 6/2006 | Rossmann | |
| 2009/0216990 A1* | 8/2009 | Vick et al. | 711/172 |

OTHER PUBLICATIONS

Jianling, Sun et al. "Transparent Access to Persistent Objects in Object-Oriented Databases." Technology of Object-Oriented Languages, 1997. Tools 24 Proceedings Beijing, China. Sep. 1997, Los Alamitos, CA, USA, IEEE Comput. Soc, US. Jan. 1, 1998. pp. 38-42.

Kemper, Alfons et al. "Hyper: A Hybrid OLTP&OLAP Main Memory Database System Based on Virtual Memory Snapshots." 2011 IDEE 27th Int'l Conference ON, IEEE, Apr. 11, 2011. pp. 195-206.

* cited by examiner

*Primary Examiner* — Sangwoo Ahn
(74) *Attorney, Agent, or Firm* — Mintz Levin Cohn Ferris Glovsky and Popeo, P.C.

(57) ABSTRACT

A plurality of virtual files are instantiated in a columnar database. The columnar database includes a columnar data store that persists tables of data contained therein to the plurality of virtual files. Each virtual file is stored in physical data storage and a portion of the virtual file can be cached transiently in a persistence layer intermediate the columnar data store and the physical data storage. The virtual files each comprise a database object for storing data records. Operation are processed, in the columnar database, using the virtual files such that changes to virtual files resulting from the operations of one transaction are isolated from changes on the same virtual files resulting from the operations of other transactions. Related apparatus, systems, techniques and articles are also described.

15 Claims, 5 Drawing Sheets

COLUMNAR DATABASE USING VIRTUAL FILE DATA OBJECTS

TECHNICAL FIELD

The subject matter described herein relates to techniques for providing virtual file data objects for use in a columnar database.

BACKGROUND

Databases can perform large numbers of concurrent transactions involving corresponding data. These concurrent transactions can result in changes to the same data (e.g., data records, etc.) which necessitate data isolation among such transactions.

SUMMARY

In one aspect, a plurality of virtual files are instantiated in a columnar database. The columnar database includes a columnar data store that persists tables of data contained therein to the plurality of virtual files. Each virtual file is stored in physical data storage and a portion of the virtual file can be cached transiently in a persistence layer intermediate the columnar data store and the physical data storage. The virtual files each comprise a database object for storing data records. Operation are processed, in the columnar database, using the virtual files such that changes to virtual files resulting from the operations of one transaction are isolated from changes on the same virtual files resulting from the operations of other transactions.

At least one data record for a first transaction can be appended while at least one other transaction is being executed. The appended at least one data record is made available for other transactions after the first transaction commits. At least one data record for a second transaction can be truncated while at least one other transaction is being executed, the truncated at least one data record (i.e., the record without being truncated) is made available to other transactions prior to the second transaction committing.

Each virtual file can be stored in a chain of database pages in the persistence layer. The database pages can have a fixed size or a variable size. References to a corresponding starting database page and a corresponding ending database page can be stored in metadata. A link to a last overwrite record for a virtual file can be stored in metadata such that the overwrite record specifies truncaction changes made to the virtual file. The metadata can be stored in a container directory that can be accessed to identify a most current version of a virtual file.

Articles of manufacture are also described that comprise computer executable instructions permanently stored on non-transitory computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages. For example, the virtual files described herein provide ACID (atomicity, consistency, isolation, durability) properties that in turn enable that database transactions to be properly processed, while at the same time, providing fast and scalable access to a large number (millions) of virtual files by a columnar data store. In addition, various special operations needed for implementation of distributed columnar database system can be easily implemented on top of virtual files.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
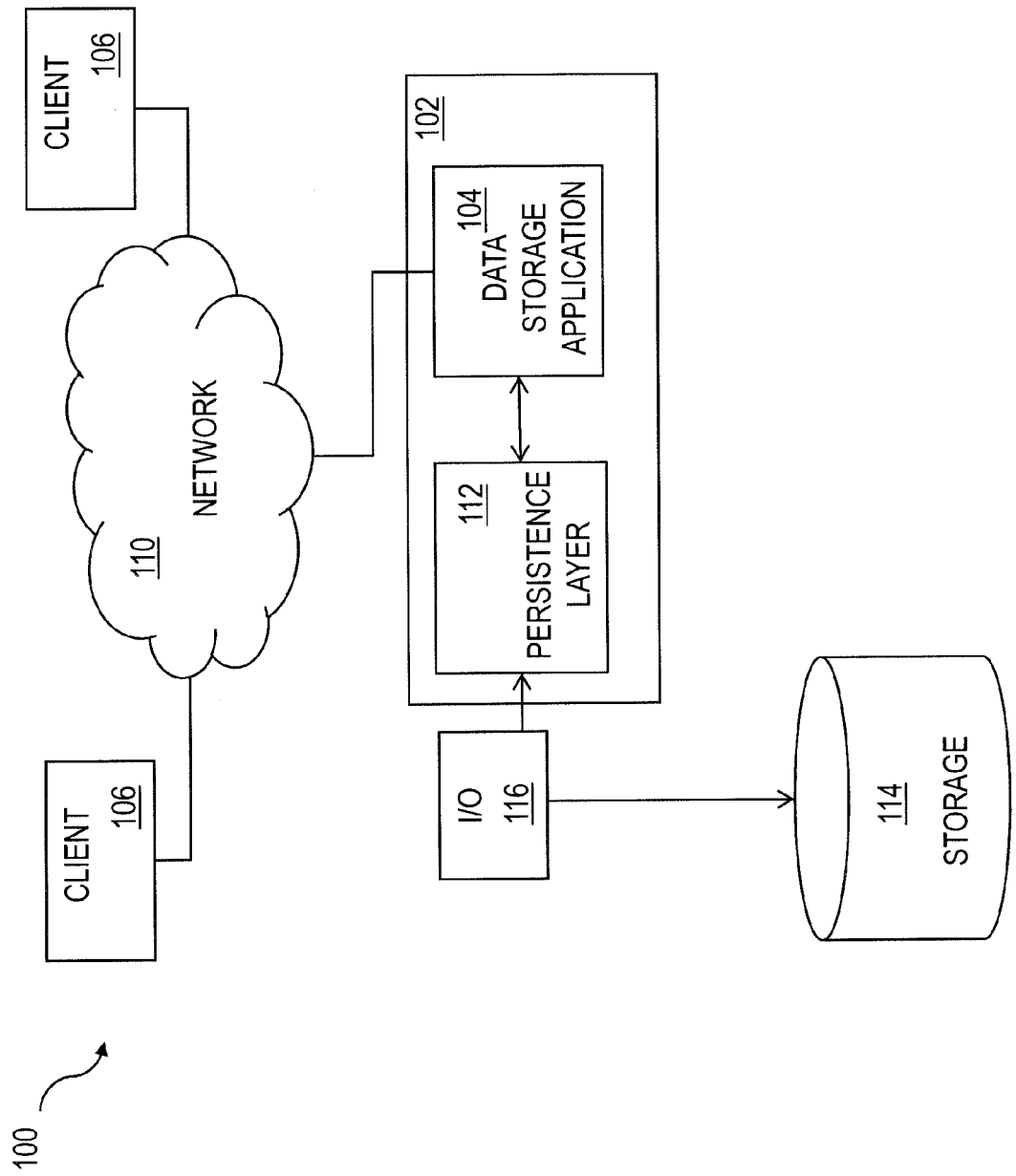
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2:
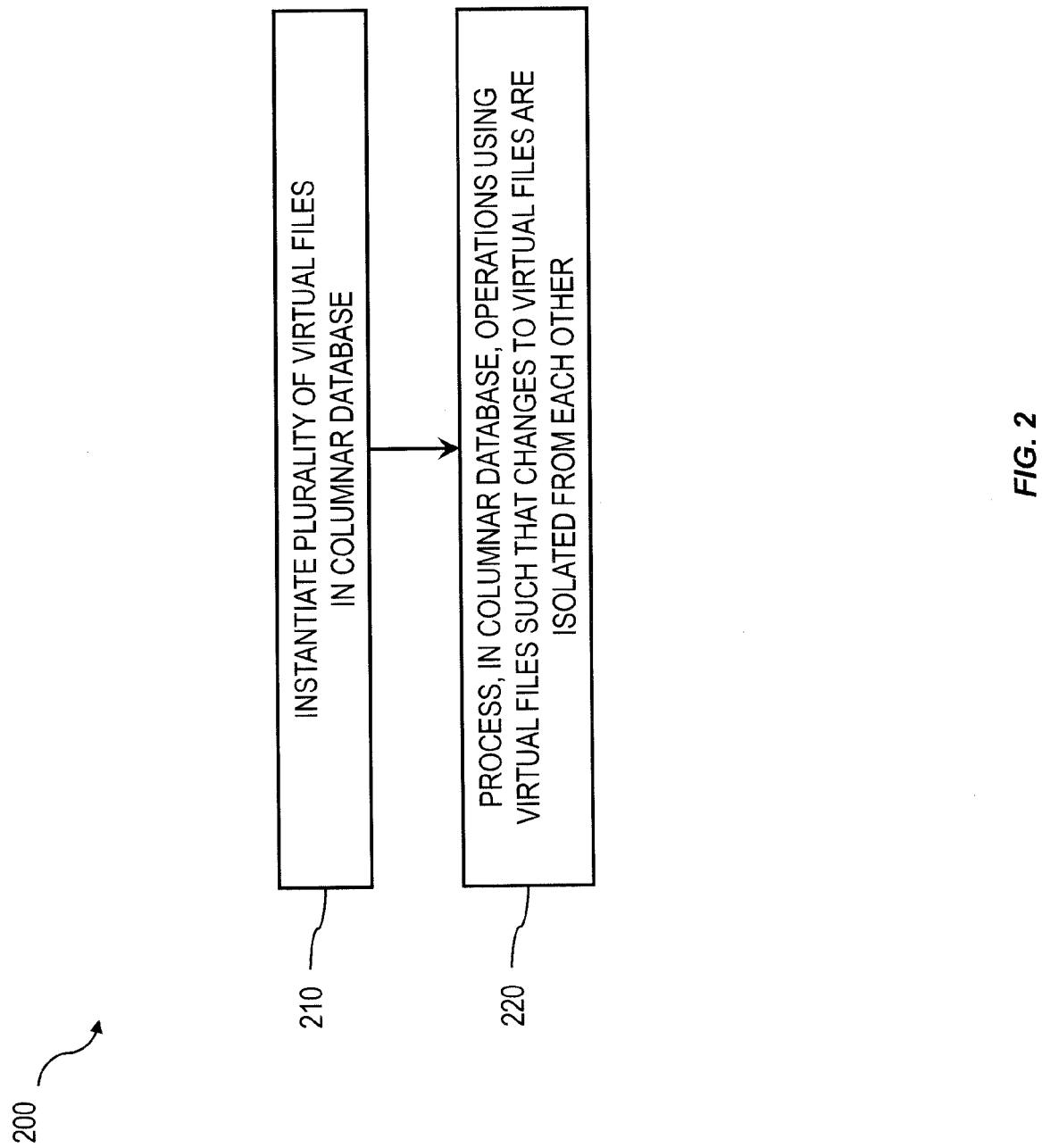
FIG. 2 is a process flow diagram illustrating the use of virtual files by a columnar database.

FIG. 2 is a process flow diagram 200 in which, at 210, a plurality of virtual files are instantiated in a columnar database. The columnar database includes a columnar data store that persists tables of data contained therein to the plurality of virtual files. Each virtual file is stored in secondary storage and portions of each virtual file may be transiently cached in a persistence layer intermediate the columnar data store and physical data storage. In addition, each virtual file comprises a database object for storing data records. After the virtual files are instantiated, at 220, operations are processed in the columnar database using the virtual files such that changes to virtual files resulting from the operations of one transaction are isolated from changes to the same virtual files resulting from the operations of other transactions.

Figure 3:
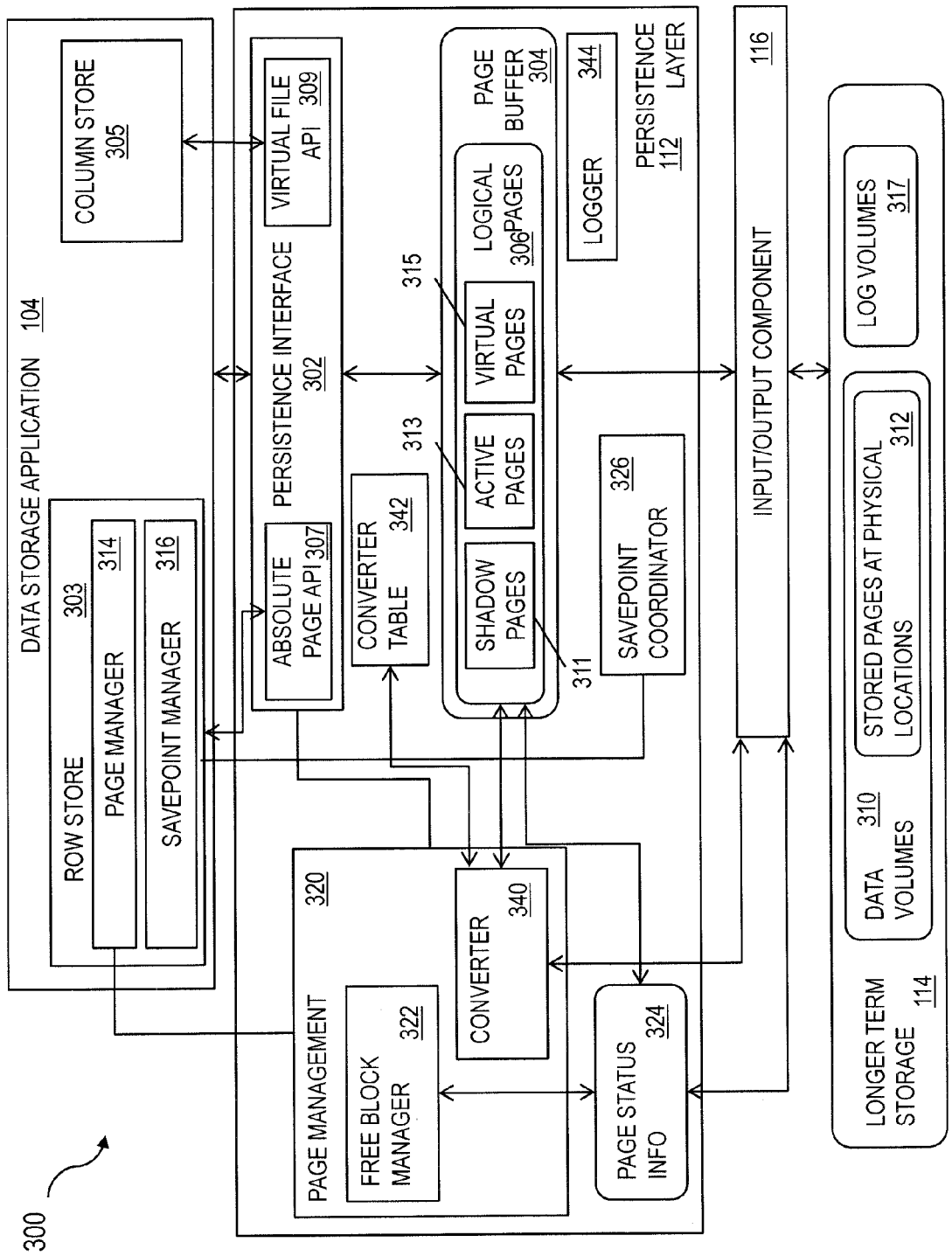
FIG. 3 is a diagram illustrating details of the system of FIG. 1.

FIG. 3 shows a software architecture 300 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 302. A page buffer 304 within the persistence layer 112 can store one or more logical pages 306, and optionally can include shadow pages 311, active pages 313, data pages of virtual files 315 (i.e., a data objects acting like a file) and the like. The logical pages 306 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 310 where stored pages 312 are allocated at physical memory blocks.

In some implementations, the data storage application 104 can include a row store 303 and a column store 305. The row store 303 can comprise or be otherwise in communication with a page manager 314 and/or a savepoint manager 316. The page manager 314 can communicate with a page management module 320 at the persistence layer 112 that can include a free block manager 322 that monitors page status information 324, for example the status of physical pages within the storage 114 and logical pages in the persistence layer 112 (and optionally in the page buffer 304). The savepoint manager 316 can communicate with a savepoint coordinator 326 at the persistence layer 204 to handle savepoints, which are used to create a consistent persistent state of the database for restart after a possible crash. The row store 303 can access the persistence interface 302 via an absolute page API 307. The column store 305 which can store columns in contiguous memory can access the persistence interface 302 via a virtual file API 309.

In some implementations of a data storage application 104, the page management module of the persistence layer 112 can implement shadow paging. The free block manager 322 within the page management module 320 can maintain the status of physical pages. The page buffer 304 can included a fixed page status buffer that operates as discussed herein. A converter component 340, which can be part of or in communication with the page management module 320, can be responsible for mapping between logical and physical pages written to the storage 114. The converter 340 can maintain the current mapping of logical pages to the corresponding physical pages in a converter table 342. The converter 340 can maintain a current mapping of logical pages 306 to the corresponding physical pages in one or more converter tables 342. When a logical page 306 is read from storage 114, the storage page to be loaded can be looked up from the one or more converter tables 342 using the converter 340. When a logical page is written to storage 114 the first time after a savepoint, a new free physical page is assigned to the logical page. The free block manager 322 marks the new physical page as "used" and the new mapping is stored in the one or more converter tables 342.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 344 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 344 whenever a change is made. This information can be written to disk at latest when the transaction ends. The log entries can be persisted in separate log volumes 317 while normal data is written to data volumes 310. With a redo log, committed changes can be restored even if the corresponding data pages were not written to disk. For undoing uncommitted changes, the persistence layer 112 can use a combination of undo log entries (from one or more logs) and shadow paging.

The persistence interface 302 can handle read and write requests of stores (e.g., in-memory stores, etc.). The persistence interface 302 can also provide write methods for writing data both with logging and without logging. If the logged write operations are used, the persistence interface 302 invokes the logger 344. In addition, the logger 344 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 344. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 344 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

The column store 305 can persist its tables to virtual files provided by the persistence layer 112 via the virtual file API 307. Internally the persistence layer 112 can map a virtual file to a chain of linked pages 315 stored in the page buffer 304. Data belonging to one columnar table can be stored in multiple virtual files: one virtual file per column for a main storage and one virtual file for a delta log. In addition, one virtual file can optionally be stored per column for the main storage of the history part of the table, and/or one virtual file can optionally be stored per table for the delta of the history part of the table. The persistence layer 112 can maintain a directory that stores for each virtual file the start page and additional information such as the size and the type of the virtual file.

As stated above, virtual files can be used to store main and delta parts of columnar tables. These files can be read on the first access of the corresponding table into memory. With some implementations, while read accesses happen only on the in-memory representation of data, updates, appends, overwrites and truncates can also be written to the virtual file on disk. After moving of a virtual file from a source node to a destination node, the virtual file can be read into memory on first access on the destination node. To support recovery from log backup, moving a virtual file from one node to the other (if the techniques described below are not incorporated) can either require writing a redo log on the destination node for all moved data or explicit expensive synchronization of recovery on several nodes, which is in both cases too big performance penalty.

The content of a main storage can only change when a delta merge operation is performed. Therefore the main virtual files can only be written when a merge is done. Note that this does not mean that main data is written to disk during a merge operation: when the column store 305 writes to a virtual file, the data can be written into the page buffer 304 of the persistence layer 112. It is the responsibility of the persistence layer 112 to determine when the data in the virtual file is actually flushed to disk (e.g., during page replacement or at latest when the next savepoint is written, etc.).

A delta merge operation is unique to the column store 305 and is not synchronized with the savepoints of the persistence layer 112. Delta merge is primarily an optimization of in-memory structures performed on the granularity of a single table. The savepoint, on the other hand, works on the whole database and its purpose is to persist changes to disk.

All changes executed on column store 305 data go into delta storages in the data volumes 310. The delta storages can exist only in memory as opposed to be written to disk. However, the column store 305 can, via the logger 344, write a persisted delta log that contains logical redo log entries for all operations executed on the delta storages. Logical log, in this context, means that the operation and its parameters are logged but no physical images are stored. When a delta merge operation is executed, the changes in the delta storage can be merged into the main storage and the delta log virtual file can be truncated.

The delta log virtual files are not really logs from the persistence layer 112 point of view. For the persistence layer 112 they are just data. The actual redo log and undo entries can be written a log volume 317 in the persistence layer 112. The virtual files used for delta logs can be configured as logged. Whenever column store 305 writes to the delta log virtual file, the persistence layer interface 302 invokes the logger 344 and an undo manager to write redo log entries and undo information. This ensures that the delta log virtual files can be restored after a restart—just like any other data. After the delta log virtual files are restored they are ready to be processed by column store 305 to rebuild the in-memory delta storages from the logical delta log entries.

During a delta merge operation the main files for the affected table(s) can be rewritten and the delta log file can be truncated. For all these operations no log is written by the persistence layer 112. This is possible, because all operations executed on the tables were already logged when the delta files were written as part of the original change operation. The merge operation does not change, create or delete any information in the database. It is just a reorganization of the way existing information is stored. To prevent that logs are written for a merge operation, the virtual main files are configured as not logged and a special not logged operation is used for delta log truncation.

During restart, the persistence layer 112 can restore the main virtual files from the last savepoint. The delta log virtual files can be restored from the last savepoint and from the redo log. When the persistence layer 112 has finished its part, the main storage of the columns can be loaded from the virtual files into column-store memory. This involves memory copy operations between data cache in the page buffer 304 of the persistence layer 112 and the contiguous memory areas in column store 305. The column store 305 can then execute the logical redo entries from delta log virtual files and rebuild the in-memory delta storages. As mentioned above, there is metadata that allows to define for each columnar table whether it is to be loaded during system startup. If a table is configured for loading on demand, the restore sequence for that table is executed on first access.

As used herein, virtual file can be characterized as a database object that simulates a file in the file system. A virtual file can be identified by a numeric identifier, such as an 8-byte ID (or indirectly by namespace+name). Virtual files can support streaming read and write I/O requests with one written stream being considered as an atomic block (with regard to parallel writes). Virtual files, as stated above, can provide a basis for storing columnar data (with a virtual file per column and a virtual file for delta information). Virtual files additionally can provide support for binary large objects (BLOBs), arbitrary data, SAP liveCache variable-sized objects, etc. Furthermore, virtual files can provide generic transactional support and transactional isolation. Reading virtual file honors transaction isolation level, so only committed, already-visible data (depending on transactional isolation level) are read. Further, virtual file has full rollback support.

Virtual files can also provide backup and recovery support together with the rest of the data storage application 104.

They also provide explicitly-controlled redo logging including changes persisted at the latest by a savepoint and support for columnar merges. Lastly, virtual files can provide support for other advanced operations, such as "lazy" file movement within a landscape (via link handling).

A virtual file, as described herein, can be anchored in some kind of container directory, which contains metadata about database objects and which is accessed in order to determine a most current virtual file or state thereof, etc. As the virtual file is stored in a chain of database pages, which can be of same or various sizes, the starting and ending page is stored in metadata. Links to previous and next page in the chain can be stored in individual page headers. Additionally, a link to a last overwrite record (see later) can be also stored in metadata. Each operation on the virtual file can operate on this page chain and creates record(s) with a small header and user data in this page chain. Each page of virtual file can normally contain at least one record. Also, a minimum (i.e., optimal) number of records can be used to store data in virtual file.

Appending to a virtual file. To enable highly-parallel operation, an append operation can first spool data streamed to it into an in-memory buffer. When the stream is closed, this data can be added as one or series of data records under a lock at the end of the page chain (one record per page). As the data is added under a lock, the whole append is atomic.

To support transaction isolation and consistent read, each data record can include the following in a header: (i) creating TID; (ii) deleting TID; and record data size (data follows immediately after the header). Creating TID can be set to the transaction ID of the transaction creating the data record (appending new data). Deleting TID can be unset at creation and can be set at truncation/overwrite to the transaction ID of the truncating transaction (as further described below).

When a transaction appending data to a virtual file aborts, it can simply unset creating TID of the records added by this transaction, effectively invalidating the new data records. When an undo operation detects that there are no valid records on the page (i.e., all records are undone, etc.), the page can be removed from page chain and reclaimed immediately (but this is not strictly necessary).

Figure 4:
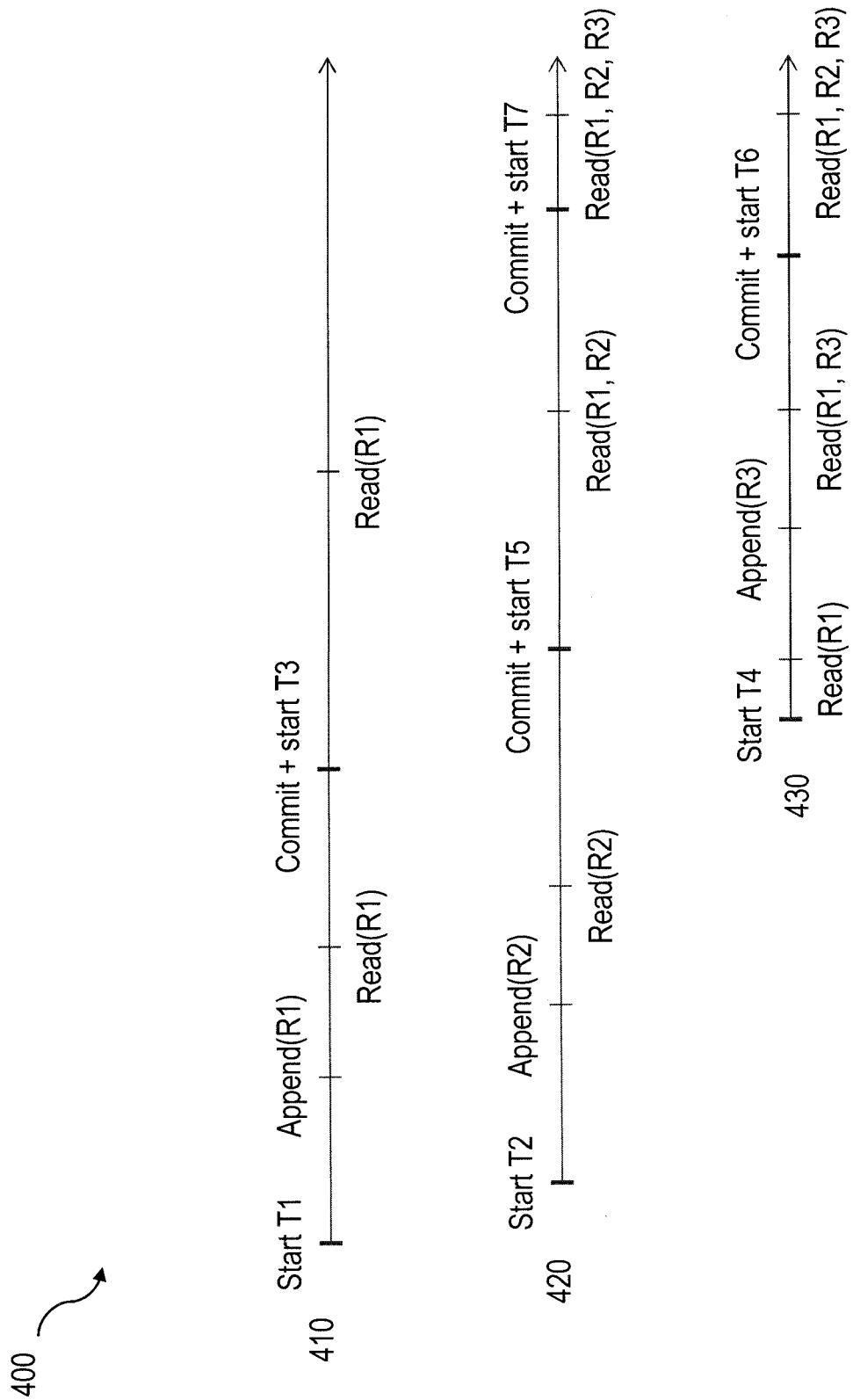
FIG. 4 is a diagram illustrating appending virtual files while transactions are being concurrently executed.

FIG. 4 is a diagram 400 which illustrates a series of transactions T1-T7 (across three timelines 410, 420, 430 which partially temporally overlap) in which there is snapshot isolation on a transaction level. At the start of T1 (in timeline 410), a corresponding virtual file is initially empty and is later appended with a record R1. Subsequent to the start of T1 but before the append of record R1, a second transaction T2 is initiated (in timeline 420) in which a second record R2 is appended. The first record R1 is read as part of the first transaction T1 and the second record R2 is read as part of the second transaction T2 (the second transaction T2 can only read the second record R2 because the first record R1 has not yet been committed). Thereafter, the first transaction T1 is committed which results in a third transaction T3 being initiated. In parallel, a fourth transaction T4 (in timeline 430) is later initiated. At this point, only record R1 has been committed and so, at this point, the fourth transaction T4 can only read the first record R1. Subsequently (in timeline 420), the second transaction is committed and a fifth transaction T5 is initiated. At this point, only the first record R1 and the second record R2 have been committed and so the second transaction T2 reads these records R1, R2. In parallel, as part of the fourth transaction T4, a third record R3 is appended and so a read operation reads the first record R1 and the third record R3 (because the fourth transaction T4 was initiated prior to the commit of the second transaction T2 in which the second record R2 was appended). Thereafter, the fourth transaction T4 is committed which results in a sixth transaction T6 which reads records R1, R2, R3 (all of which have been committed at such point). Similarly, the fifth transaction T5 is committed which results in a seventh transaction T7 which also reads records R1, R2, R3.

Truncating/overwriting a virtual file. Truncate and overwrite operations can also operate under a lock on the virtual file. With such an arrangement, each virtual file can have an associated lock, which is taken when a changing operation on the file is in progress. This includes finishing of an append operation (transferring data from in-memory buffer to the virtual file), a truncation operation, and an overwrite operation (which is truncation+appending new data). This ensures that the operations on the virtual file are serialized and internal structures are not damaged.

Truncations operations can add a special truncation record and set deleting TID of visible data records between last visible position (or start of page chain, if no last visible position exists, as further described below) and the new truncation record. In case of overwrite, streamed data can be written as new data records at the end of virtual file (same as appending data).

To facilitate transaction isolation and consistency, truncating/overwriting the virtual file can add a special truncation record with following header and no data: (i) creating TID; (ii) link to the oldest readable position (page+offset); and (iii) link to the previous truncation record (page+offset).

At the same time, the link to truncation record can be updated in the virtual file metadata in the container directory to point to the newest truncation record.

In one implementation, truncation/overwrite can work as follows. The algorithm can start with a last known truncation record, as stored in virtual file metadata in container directory. If this truncation record is not visible and thus the truncation itself is not visible (i.e., creating TID of truncation record belongs to a parallel or newer transaction), then this is an error (parallel transaction truncating the virtual file). If no truncation record exists, the algorithm assumes beginning of the virtual file as a kind of truncation record.

A new truncation record can be written at the end of the virtual file, with creating TID set to the TID of the truncating transaction, link to the oldest readable position is not set and link to previous truncation record can be set to the position of previous truncation record, if it exists, or, otherwise, to the beginning of the virtual file. The link to the truncation record in virtual file metadata can be updated to point to the new truncation record.

The link to the oldest readable position can be read from the previous truncation record, if it exists (the beginning of the virtual file is used otherwise). This position was stored during previous file truncation operation and points to the oldest data record, which was written by a transaction newer or parallel to the previous truncation transaction.

Then, marking of truncated records can start from this position. For each data record found, creating TID of this data record is checked for visibility. If the data record is visible (i.e., its creating TID belongs to a transaction older than truncation transaction and creating transaction is not parallel to truncation transaction), then its deleting TID can be set to the TID of the truncating transaction. If the data record is NOT visible and its deleting TID is NOT set and it is the first such not visible record, link to its position is stored as the oldest readable position in the new truncation record. The algorithm can repeat for all records up to the new truncation record.

If the oldest readable position was not found, it means no records have been added in parallel transactions. In this case, the link to the oldest readable position can be set to point to the new truncation record.

In case of overwrite, new data can be appended just like in append case described above after the truncation finishes.

When a transaction truncating a virtual file aborts, it can simply unset deleting TIDs of all records where it set deleting TIDs during the truncation operation, then it can reset the link in virtual file metadata to point to the previous truncation record and then it can invalidate the new truncation record (e.g., by unsetting creating TID, so the record will be ignored by other operations).

Figure 5:
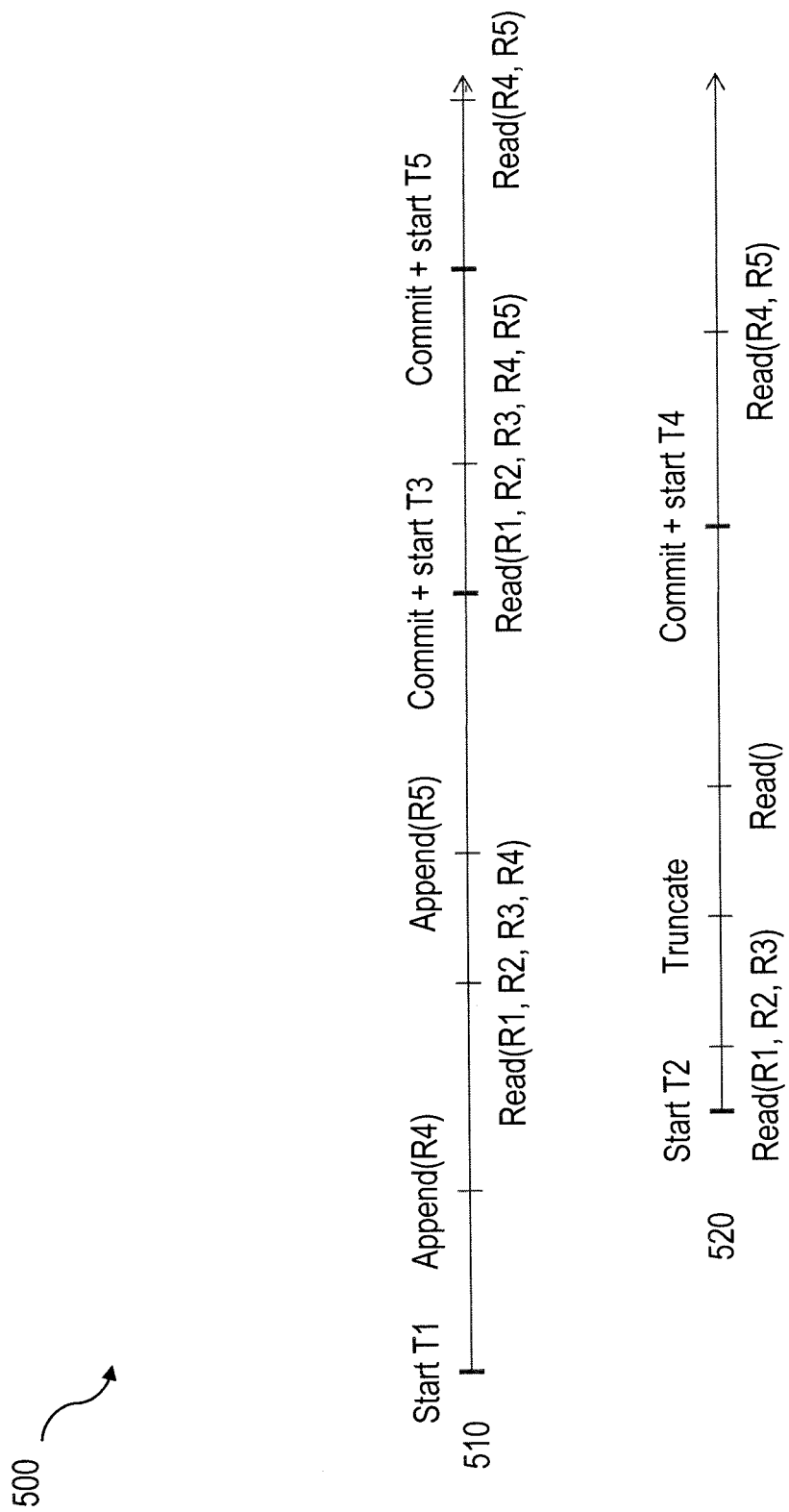
FIG. 5 is a diagram illustrating truncating virtual files while transactions are being concurrently executed.

FIG. 5 is a diagram 500 which illustrates a series of transactions T1-T5 across two timelines 510, 520 which partially temporally overlap. At the time a first transaction T1 (in timeline 510) is initiated, a corresponding virtual file contains three records R1, R2, R3. Thereafter, a fourth record R4 is appended (and a read operation is subsequently performed by the first transaction T1 which reads all four records R1, R2, R3, R4). Thereafter, a second transaction T2 is initiated (in timeline 520). At this point, all three records R1, R2, R3 are read by the second transaction. The second transaction T2 initiates a truncate operation which causes all records to be purged. However, this truncation does not affect the first transaction T1 until it has been committed. In the meantime, a fifth record has been added R5 and committed. Thus, at the point the second transaction T2 is committed, the virtual file contains records R4, R5 (because they were not part of the truncation) which are read as part of a subsequent fourth transaction T4 in timeline 520) and a subsequent fifth transaction T5 (in timeline 510).

Reading a virtual file. First, oldest visible data record for a reading transaction can be determined. A reading transaction can "see" all visible data records starting from the last visible truncation record and also any data records appended in parallel transactions while truncation ran. To determine the first read position, the algorithm can start with the last known truncation record, as stored in virtual file metadata in container directory. If this truncation record is not visible and thus the truncation itself is not visible (i.e., creating TID of the truncation record belongs to a parallel or newer transaction), then link to the previous truncation record can be followed and the algorithm can repeat with the previous truncation record.

When the last visible truncation record is determined, the link to the oldest readable position can be read from this truncation record. This position can be stored during file truncation operation and points to oldest data record, which was written by a transaction newer or parallel to truncation transaction (see above). This is also the first record, from where reading starts.

If there was no truncation record found, then the reading can start from the beginning of the virtual file.

With this information, the reader of the virtual file can simply read all records starting at the oldest visible data record for this reader, where creating TID can be visible (i.e., belongs to a transaction not newer than own TID and not running in parallel to the reading transaction) and deleting TID can be unset or invisible (i.e., belongs to a transaction newer than own TID or running in parallel to the reading transaction). This read operation can be repeated any number of times and will return always the same data for the same transaction (except when the transaction itself modified the virtual file).

Garbage collection of a virtual file. As data is always appended at the end, the virtual file would grow indefinitely, even in presence of truncates. But, only data visible to any running transaction are needed, old data can be garbage-collected. Garbage collection can be performed for each truncation record, when the minimum TID of all reading transactions passes TID of the truncation record. The tracking of minimum read TID and execution of garbage collection itself can be performed, for example, by a history manager of the database. Important is, the garbage collection is executed only for records, which are not needed by any reading transaction.

Garbage collection of a virtual file can be extremely simple—all pages in the page chain of the virtual file before the oldest readable position as stored in the truncation record can be removed from the page chain and returned to the free space management. In a shadow-paging database (as described above), these pages can stay on the disk as shadow pages, until the next savepoint is executed, which will then reclaim free space. Stated differently, logical space is freed upon garbage collection while physical space is freed upon a savepoint.

Special operations on a virtual file. A virtual file can support a number of special operations. To support such operations, an extended data record, which represents the operation, can be appended to the virtual file. Then, such operation can be truncated and garbage-collected like any normal append operation.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A non-transitory computer program product storing instructions that, when executed by at least one programmable processor, cause the at least one programmable processor to perform operations comprising:
   persisting a table of a columnar database to a plurality of virtual files provided by a persistence layer of the columnar database, the columnar database comprising a columnar data store and a physical data storage, the persistence layer being intermediate to the physical data storage and the columnar data store, each virtual file of the plurality of virtual files being stored in the physical data storage and comprising a database object for storing data records, some or all of the plurality of virtual files being available for transient caching in the persistence layer;
   processing, in the columnar database, operations using a virtual file of the plurality of virtual files, the operations comprising at least one of truncation, overwriting, and appending of data records in the virtual file;
   storing, as part of the processing, truncation records for the virtual file in virtual file metadata, each truncation record comprising a creating transaction identifier (TID) for a truncation operation associated with the truncation record, information identifying an oldest readable position, and information identifying a last previous truncation record to the truncation record;
   truncating the virtual file as part of a first transaction while second transaction is being executed at least partially in parallel with the first transaction such that the virtual file is available to the second transaction prior to the first transaction committing, the truncating comprising:
      identifying a last known truncation record in the virtual file metadata, the last known truncation record having been stored during a most recent previous truncation operation, the last known truncation record pointing to an oldest readable position, the oldest readable position comprising an oldest data record in the virtual file that was written after or during the most recent previous truncation operation;
      reviewing the creating TID for each of one of more data records in the virtual file newer than the oldest readable position;
      marking a data record of the one or more data records with a deleting TID corresponding to the first transaction when the creating TID for the data record belongs to a transaction older than the first transaction or storing a link to the data record as a new oldest readable position when the creating TID for the data record does not belong to any transaction older than the first transaction.

2. A computer program product as in claim 1, wherein the operations further comprise:
   appending at least one data record for the first transaction while at least one other transaction is being executed, the appended at least one data record being available for other transactions after the first transaction commits.

3. A computer program product as in claim 1, wherein each virtual file is stored in a chain of database pages in the persistence layer.

4. A computer program product as in claim 3, wherein the database pages have a fixed size.

5. A computer program product as in claim 3, wherein the database pages have varying sizes.

6. A computer program product as in claim 3, wherein the operations further comprise:
   storing, for each virtual file, references to a corresponding starting database page and a corresponding ending database page in metadata.

7. A computer program product as in claim 1, wherein the operations further comprise:
   storing the metadata in a container directory, the container directory being accessed to identify a most current version of a virtual file.

8. A method comprising:
   persisting a table of a columnar database to a plurality of virtual files provided by a persistence layer of the columnar database, the columnar database comprising a columnar data store and a physical data storage, the persistence layer being intermediate to the physical data storage and the columnar data store, each virtual file of the plurality of virtual files being stored in the physical data storage and comprising a database object for storing data records, some or all of the plurality of virtual files being available for transient caching in the persistence layer;
   processing, in the columnar database, operations using a virtual file of the plurality of virtual files, the operations comprising at least one of truncation, overwriting, and appending of data records in the virtual file;
   storing, as part of the processing, truncation records for the virtual file in virtual file metadata, each truncation record comprising a creating transaction identifier (TID) for a truncation operation associated with the truncation record, information identifying an oldest readable position, and information identifying a last previous truncation record to the truncation record;

truncating the virtual file as part of a first transaction while second transaction is being executed at least partially in parallel with the first transaction such that the virtual file is available to the second transaction prior to the first transaction committing, the truncating comprising:

identifying a last known truncation record in the virtual file metadata, the last known truncation record having been stored during a most recent previous truncation operation, the last known truncation record pointing to an oldest readable position, the oldest readable position comprising an oldest data record in the virtual file that was written after or during the most recent previous truncation operation;

reviewing the creating TID for each of one of more data records in the virtual file newer than the oldest readable position;

marking a data record of the one or more data records with a deleting TID corresponding to the first transaction when the creating TID for the data record belongs to a transaction older than the first transaction or storing a link to the data record as a new oldest readable position when the creating TID for the data record does not belong to any transaction older than the first transaction.

9. A method as in claim 8, further comprising:
appending at least one data record for the first transaction while at least one other transaction is being executed, the appended at least one data record being available for other transactions after the first transaction commits.

10. A method as in claim 8, wherein each virtual file is stored in a chain of database pages in the persistence layer.

11. A method as in claim 10, wherein the database pages have a fixed size.

12. A method as in claim 10, wherein the database pages have varying sizes.

13. A method as in claim 10, further comprising: storing, for each virtual file, references to a corresponding starting database page and a corresponding ending database page in metadata.

14. A method as in claim 8, further comprising: storing the virtual file metadata in a container directory, the container directory being accessed to identify a most current version of the virtual file.

15. A system comprising:
at least one programmable processor;
memory coupled to the at least one programmable processor, the memory storing instructions, which when executed by the at least one programmable processor, cause the at least one programmable processor to perform operations comprising:

persisting a table of a columnar database to a plurality of virtual files provided by a persistence layer of the columnar database, the columnar database comprising a columnar data store and a physical data storage, the persistence layer being intermediate to the physical data storage and the columnar data store, each virtual file of the plurality of virtual files being stored in the physical data storage and comprising a database object for storing data records, some or all of the plurality of virtual files being available for transient caching in the persistence layer;

processing, in the columnar database, operations using a virtual file of the plurality of virtual files, the operations comprising at least one of truncation, overwriting, and appending of data records in the virtual file;

storing, as part of the processing, truncation records for the virtual file in virtual file metadata, each truncation record comprising a creating transaction identifier (TID) for a truncation operation associated with the truncation record, information identifying an oldest readable position, and information identifying a last previous truncation record to the truncation record;

truncating the virtual file as part of a first transaction while second transaction is being executed at least partially in parallel with the first transaction such that the virtual file is available to the second transaction prior to the first transaction committing, the truncating comprising:

identifying a last known truncation record in the virtual file metadata, the last known truncation record having been stored during a most recent previous truncation operation, the last known truncation record pointing to an oldest readable position, the oldest readable position comprising an oldest data record in the virtual file that was written after or during the most recent previous truncation operation;

reviewing the creating TID for each of one of more data records in the virtual file newer than the oldest readable position;

marking a data record of the one or more data records with a deleting TID corresponding to the first transaction when the creating TID for the data record belongs to a transaction older than the first transaction or storing a link to the data record as a new oldest readable position when the creating TID for the data record does not belong to any transaction older than the first transaction.

* * * * *